United States Patent [19]

House

[11] 4,324,100
[45] Apr. 13, 1982

[54] HYDRAULICALLY CONTROLLED MIRROR

[76] Inventor: John I. House, 27201 Wellington Dr., Franklin, Mich. 48025

[21] Appl. No.: 105,421

[22] Filed: Dec. 19, 1979

[51] Int. Cl.³ .............................................. F15B 7/00
[52] U.S. Cl. ........................................ 60/545; 60/586
[58] Field of Search ................ 60/538, 545, 561, 586; 64/29

[56] References Cited

U.S. PATENT DOCUMENTS

| | | | |
|---|---|---|---|
| 2,563,168 | 8/1951 | Herriott | 60/561 |
| 3,093,971 | 6/1963 | Van Deberg | 60/538 |
| 3,491,839 | 1/1970 | McIntire | 64/29 |
| 3,702,535 | 11/1972 | House | 60/570 |
| 3,786,693 | 1/1974 | Keipert | 64/29 |
| 4,066,136 | 1/1978 | Wanner | 64/29 |

Primary Examiner—Abraham Hershkovitz
Attorney, Agent, or Firm—Whittemore, Hulbert & Belknap

[57] ABSTRACT

A remote control actuating mechanism for adjusting the angular position of an outside vehicle rearview mirror. The mechanism comprises a master control device and a slave device, each having a piston reciprocable within a cylinder. Closed hydraulic circuits connect the two devices so that when the control piston is manually moved in one direction or the other, there is a corresponding movement of the slave piston. A rack and gear connection between the slave piston and the mirror causes the mirror to be angularly adjusted in response to movement of the slave piston.

A reversible electric motor drives the master piston through an overload slip clutch assembly.

2 Claims, 5 Drawing Figures

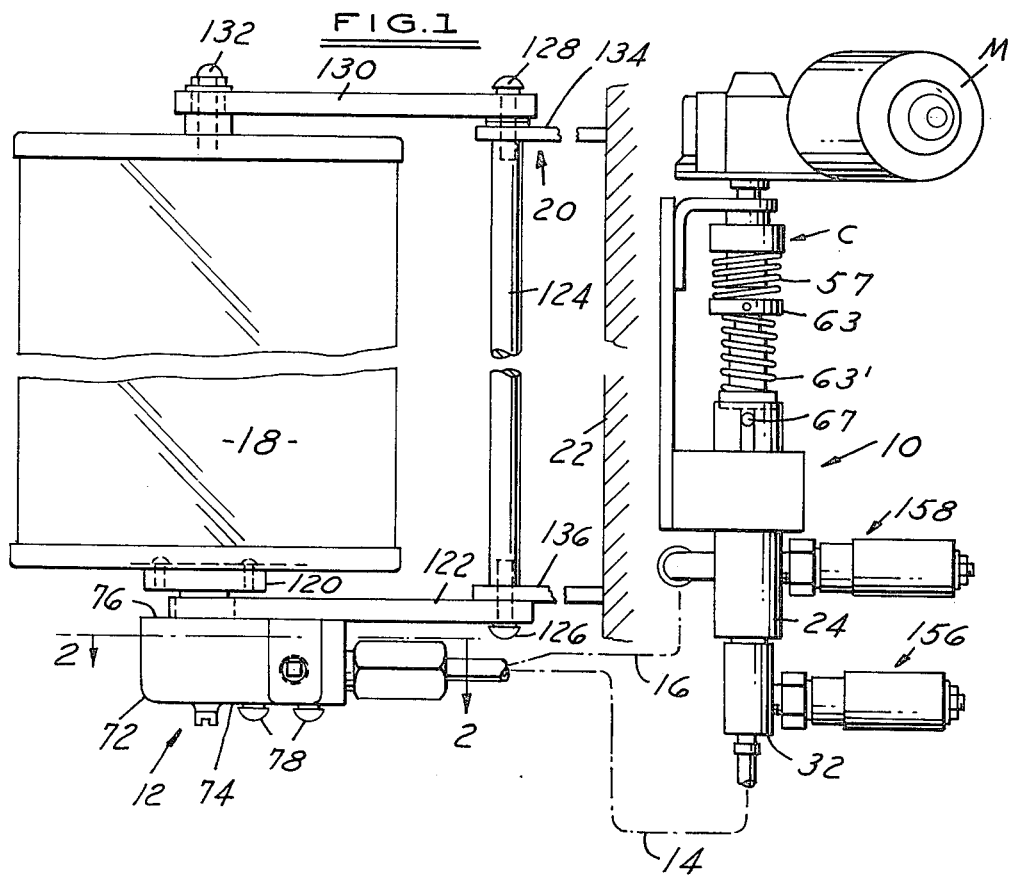
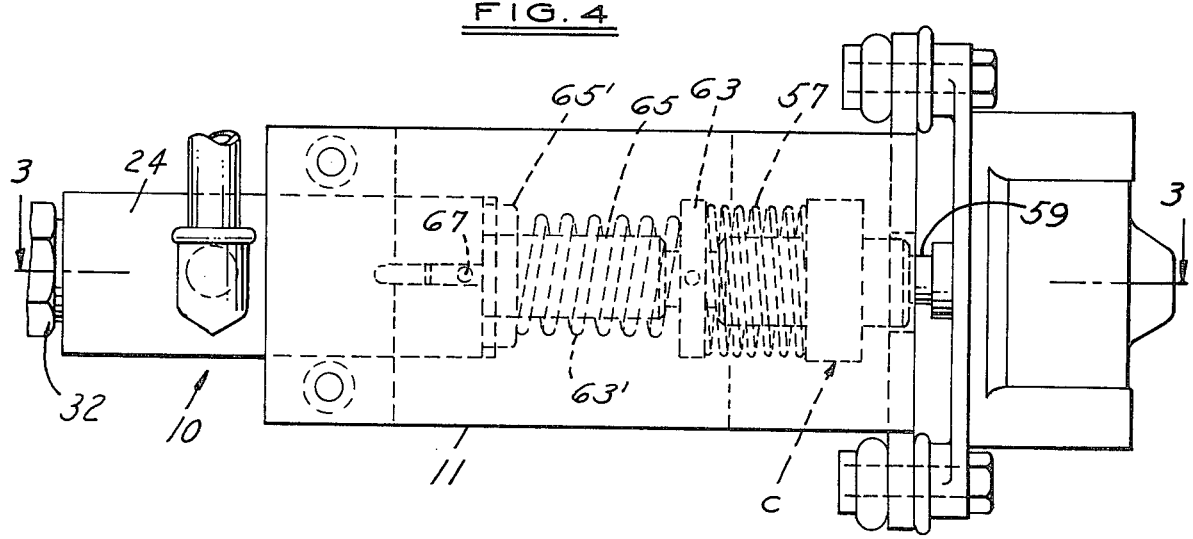

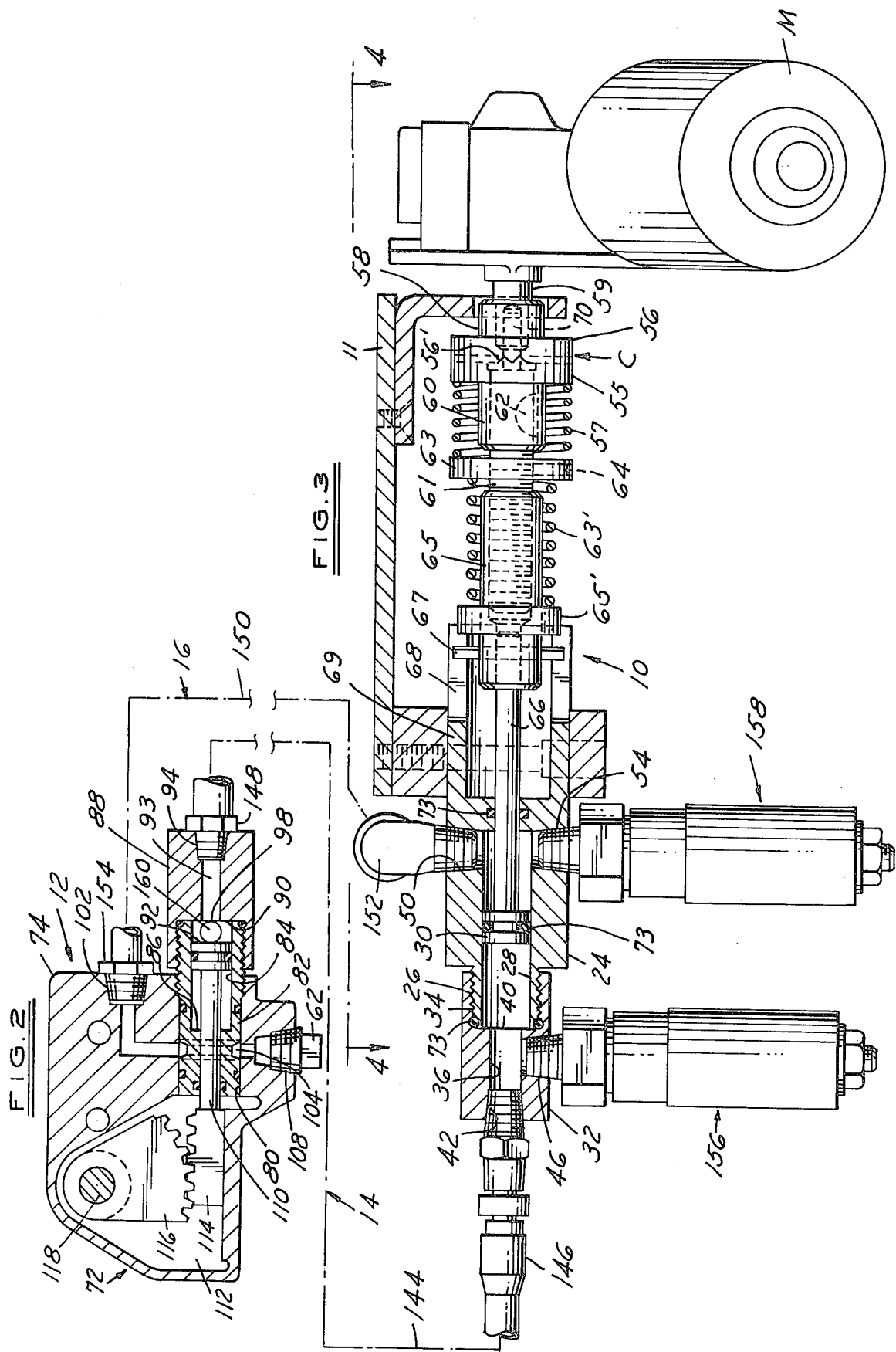

HYDRAULICALLY CONTROLLED MIRROR

This invention relates to a remote control actuating mechanism for adjusting the angular position of an outside vehicle rearview mirror and is an improvement on my prior U.S. Pat. No. 3,702,535.

SUMMARY OF THE INVENTION

A primary object of this invention is to provide a reversible electric motor and overload slip clutch assembly for the remote control actuating mechanism, replacing the manual drive used in the past. The slip clutch assembly will transmit power from the motor under normal loads, but will slip to protect the actuating mechanism motor in the event of an overload condition such as that due to icing of the mirror, for example.

Other objects and features of the invention will become apparent as the description proceeds, especially when considered in conjunction with the accompanying drawings, wherein:

FIG. 1 is a view in elevation showing a rearview mirror and remote control actuating mechanism mounted on the side or on the door of a vehicle.

FIG. 2 is a sectional view of the slave device which forms part of the actuating mechanism.

FIG. 3 is a sectional view of the master control device which forms another part of the actuating mechanism.

FIG. 4 is an elevational view of the master control device, as seen on the line 4—4 in FIG. 3.

Figure 5:
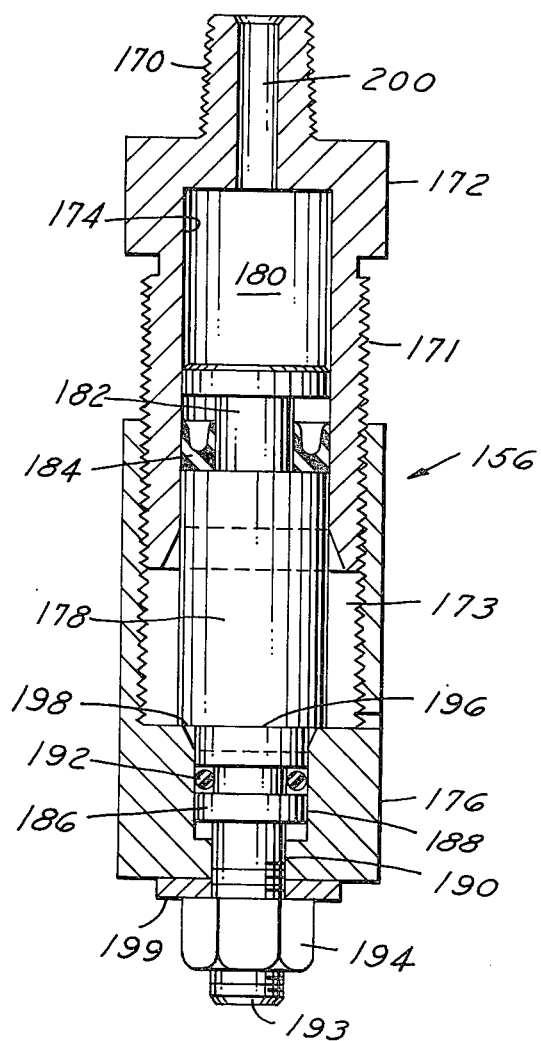
FIG. 5 is a sectional view of a reservoir forming part of the mechanism.

Referring now more particularly to the drawing, the remote control actuating mechanism includes a control device 10, a slave device 12, closed hydraulic circuits 14 and 16 connecting the two devices, a vertical rearview mirror 18 angularly adjustably mounted on the slave device, and a bracket assembly 20 for mounting the slave device and mirror outside the vehicle on the door or side 22 thereof. The remote control mechanism for the mirror is particularly designed for use in connection with trucks and buses.

The master control device 10 comprises an elongated tubular casing 24 mounted on bracket 11 secured to door 22 and having a reduced extension 26 at one end. A cylinder 28 of uniform circular cross section is provided in the casing extending from an intermediate point in its length through the end of the reduced extension 26. A piston 30 is reciprocal within cylinder 28.

A tubular cap 32 is threaded on the extension 26 of casing 24 where indicated at 34. The cap 32 has a chamber 36 communicating with the cylinder 28. The annular wall 28 in the casing and the annular wall 40 in the cap define the ends of the cylinder 28 and also define the limits of movement of piston 30.

The cap 32 has a pressure port 42 communicating with chamber 36 at one side of piston 30 and also a filler port 46. The casing 24 has a pressure port 50 communicating with the cylinder 28 at the opposite side of the piston as well as a filler port 54.

A reversible electric motor M is fixed with respect to bracket 11 and is provided to reciprocate piston 30. A clutch assembly C between the motor M and piston 30 comprises two clutch discs 55 and 56 having opposed clutch faces which engage to transmit the drive. These clutch faces are formed with 90° V-shaped serrations 56' which will slip over one another when too much resistance is encountered, the amount of resistance necessary to cause the clutch to slip depending upon the tension applied to the compression coil spring 57. The clutch disc 56 has a boss 58. A central passage extends through both the disc 56 and the boss 58. This passage is formed with longitudinal serrations and fits over the serrated output shaft 59 of the motor M so that there is a positive no-slip drive between the output shaft 59 and the clutch disc 56. The other clutch disc 55 has a boss 60. A central passage through the clutch disc 55 and boss 60 receives the shank of a screw 61. A key 62 connects the screw shank to the boss 60 of the clutch disc 55 so that the two turn as a unit. However, the key 62 permits the clutch disc 55 to move axially on the screw shank so that the clutch can slip. An abutment 63 on the screw 61 is held in longitudinally adjusted position by a set screw 64 to regulate the tension on the spring 57 which is compressed between the abutment 63 and the clutch disc 55. The screw 61 threads into the elongated nut 65 to which is secured the rod 66 of the piston 30. The nut 65 can move axially with respect to the casing 24 but is prevented from rotating relative to the casing by a pin 67 extending across the nut and into the diametrically opposed slots 68 in the tubular casing extension 69. Rotation of the screw 61 by the motor M through the clutch assembly C causes reciprocation of the elongated nut 65 and of the piston 30.

The screw 61 has on the end opposite the threaded portion a reduced cylindrical extension 70 which fits rotatably into the serrated output shaft 59 of the motor M to serve as a center or guide.

A compression coil spring 63' encircles the nut 65 and is compressed between the abutment 63 and thrust bearing 65' mounted in a recess in the end of the casing extension 69. The spring 63' presses against the abutment 63 with enough pressure to prevent the abutment 63 and screw 61 from backing away from clutch assembly C and reducing the compression of spring 57 when the screw 61 turns in nut 65 in a direction to move piston 30 to the right in FIG. 3. Reducing the compression on spring 57 will permit the premature slipping of clutch assembly C.

Suitable O-ring seals 73 are provided for the piston 30, between the casing extension 26 and cap 32, and in casing 24 around piston rod 66.

The slave device 12 comprises a casing 72 having a body portion 74 and a cover portion 76 which are preferably fastened together as by the bolts 78. The body 74 has an elongated cylindrical opening 80 in one end threadedly receiving an elongated tubular plug 82. The plug 82 has a cylinder 84 extending from the annular wall 86 within the plug to the outer end of the plug beyond the casing. A tubular cap 88 is threaded on the outer end of the plug and has an annular wall 90 defining the other end of cylinder 84. The piston 92 is reciprocable within cylinder 84 within the limits provided by walls 86 and 90. The piston 92 and cylinder 84 are the same diameter as piston 30 and cylinder 28 of the control device 10.

The cap 88 has a chamber 93 which communicates with one end of cylinder 84 and which has a pressure port 94. Chamber 93 also has a bleeder port 98. The body 74 of the slave device has a pressure port 102. This port 102 communicates with the opposite end of the cylinder 84 through passages 104 in the plug 82. There is also a bleeder port 108 communicating with the same end of the cylinder 84.

The piston 92 has a rod 110 which extends through a passage in the plug into a chamber 112 in the body 74 where it is threadedly connected to a rack 114. The rack is in mesh with a gear segment 116 secured to a shaft 118, the upper end of which has a mounting 120 secured to the lower end of the mirror 18. The shaft 118 is suitably journaled for rotation in the casing 72.

As seen in FIG. 1, the mounting 20 for the mirror assembly includes a plate 122 bolted to the slave device 12. A vertical shaft 124 runs alongside the mirror and is pivotally connected to the plate 122 by a bolt 126. The upper end of the shaft 124 is pivotally connected by a bolt 128 to an arm or plate 130 which is pivotally connected by fastener 132 to the upper end of the mirror. The bolts 126 and 128 apply sufficient tension to retain the angular adjustment of the plates 122 and 130 although permitting a manual change in the adjustment. Not only is the mirror thus adjustable angularly about shaft 124, but it is also adjustable angularly about the common axis of shaft 118 and fastener 132. Mounting arms 134 and 136 serve to mount the shaft 124 to the side or door of the vehicle.

Suitable O-ring seals are provided for the piston 92, between plug 82 an cap 88, in plug 82 around piston rod 110 and between plug 82 and body 74.

The hydraulic circuit 14 connecting the two devices 10 and 12 includes a flexible conduit 144 having fittings 146 and 148 at the ends respectively threaded into the pressure ports 42 and 94 of the devices 10 and 12. The hydraulic circuit 16 includes a flexible conduit 150 having fittings 152 and 154 at the ends respectively threaded into the pressure ports 50 and 102 of the devices 10 and 12. The fittings communicate through the pressure ports with the cylinders 28 and 84 in the devices 10 and 12 at opposite sides of the pistons therein so that the hydraulic circuits 14 and 16 are closed circuits.

Reservoirs 156 and 158 have threaded extensions 170 which thread into the filler ports 46 and 54 in the control device 10. The reservoirs provide a reserve supply of hydraulic fluid for the two hydraulic circuits. The reservoirs are of identical construction and, therefore, a description of one will suffice for both.

Reservoir 156 has a reservoir body 172 which is in the form of an elongated tubular member having a cylindrical bore 174 open at one end and having the threaded extension 170 at the opposite end. Threads 171 are formed externally on the body. The reservoir also comprises a housing 176 which is an elongated tubular member open at one end and telescoped over the open end of the tubular body 172. Threads 173 are formed internally on the housing and engage the threads 171 on the body. A plunger 178 secured within the tubular housing 176 extends into cylindrical bore 174 so that its end defines with the bore a reservoir chamber 180. The plunger has a reduced intermediate section 182 which is surrounded by a U-cup packing 184.

The plunger 178 has on the end opposite that end which enters the cylindrical bore 174 of the body 172 a reduced extension 186 fitting in a counter bore 188 in a passage 190 through the end wall of the housing, with a static O-ring seal 192 seated in an annular groove in the reduced extension. This extension has a bolt end 193 extending through passage 190 and a nut 194 threaded on its end outside the housing to lock the end 196 of the plunger 178 tight against the inner end wall 198 of the housing 176. A washer 199 surrounds bolt end 193 under the nut 194.

The housing can be threaded in and out on the body to change the volume of the reservoir chamber 180. This chamber 180 is in direct communication with the hydraulic circuit 14 or 16 through passage 200 in the extension 170. If the oil in the circuit 14 or 16 should need to be replenished, as by reason of a leak, for example, the plunger 178 may be advanced in the bore 174 by rotation of the housing 176 to force hydraulic fluid from the chamber into the circuit. The circumferentially outer surface of the housing 176 may be polygonal so that it can be turned with a wrench.

Bleeder plugs 160 and 162 are threaded into the bleeder ports 98 and 108 in the device 12. These plugs are removable to bleed air from the circuits. It will be understood that the two hydraulic circuits will normally be completely filled with hydraulic fluid and maintained in a filled condition by the reservoirs 156 and 158. Any air in the circuits should be bled away at the bleeder ports so that the slave device 12 may be operated by the control device 10 without any sponginess.

In use, the control device 10 may be mounted anywhere on the vehicle, as long as the reversing switch for the motor M is located conveniently for operation. The operator may then angularly adjust the mirror by operating the motor to move piston 30 in the control device 10 one way or the other. The clutch assembly C will transmit power from the motor M to piston 30 under normal loads, but will slip, that is one clutch disc will rotate relative to the other as the disc serrations ratchet over one another, to protect the hydraulic system including the cylinders and pistons in the event of an overload condition such as might occur due to icing or an accumulation of dirt, for example. Without the slip clutch assembly, the piston 30 could conceivably be driven through the end of its cylinder. The clutch may be adjusted to vary the load at which it will slip by moving the abutment 63 to place the spring 57 under greater or lesser compression.

I claim:

1. Remote control actuating mechanism for adjusting the position of an outside vehicle rearview mirror or the like, comprising a master control device and a slave device, said control device having a hydraulic control cylinder and a control piston reciprocable therein, said slave device having a hydraulic slave cylinder and a slave piston reciprocable therein, a first closed hydraulic circuit including a conduit filled with hydraulic fluid communicating at its ends with said cylinders at one side of the pistons therein, a second closed hydraulic circuit including a conduit filled with hydraulic fluid communicating at its ends with said cylinders at the opposite side of the pistons therein, a reversible electric motor for reciprocating said control piston, a motor output shaft, a second shaft aligned with said motor output shaft, a slip clutch assembly between said motor and said control piston comprising a pair of clutch discs, one of said clutch discs being secured to said motor output shaft, the other of said clutch discs being nonrotatably, axially slidably mounted on said second shaft, a nut connected to said control piston and threaded on said second shaft to effect reciprocation of said control piston by the operation of said motor, an abutment secured on said second shaft, spring means between said abutment and said other of said clutch discs to press it against said one of said clutch discs in clutching engagement, and second spring means bearing against said abutment in opposition to said first-mentioned spring means to prevent said abutment and second shaft from backing away from said clutch assembly and reducing the pressure of said first-mentioned spring means when said motor is operated to move said control piston toward said clutch assembly.

2. Remote control mechanism as defined in claim 1, wherein means are provided for securing said abutment on said second shaft in axially adjusted position.

* * * * *